US008499864B2

(12) United States Patent
Takenaka et al.

(10) Patent No.: US 8,499,864 B2
(45) Date of Patent: Aug. 6, 2013

(54) WHEEL, AND FRICTION DRIVE DEVICE AND OMNI-DIRECTIONAL VEHICLE USING THE SAME

(75) Inventors: Toru Takenaka, Saitama (JP); Makoto Hirano, Saitama (JP); Hiroshi Gomi, Saitama (JP); Masao Sasaki, Saitama (JP); Taiji Koyama, Saitama (JP); Shinichiro Kobashi, Saitama (JP); Hideharu Izumi, Saitama (JP); Kazuya Kuwabara, Saitama (JP); Hiroyuki Makino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 13/263,931

(22) PCT Filed: Mar. 15, 2010

(86) PCT No.: PCT/JP2010/001847
§ 371 (c)(1),
(2), (4) Date: Oct. 11, 2011

(87) PCT Pub. No.: WO2010/119612
PCT Pub. Date: Oct. 21, 2010

(65) Prior Publication Data
US 2012/0032496 A1 Feb. 9, 2012

(30) Foreign Application Priority Data
Apr. 15, 2009 (JP) ................................. 2009-098705

(51) Int. Cl.
*B60B 19/12* (2006.01)

(52) U.S. Cl.
USPC ................. 180/7.1; 180/21; 180/20; 180/10

(58) Field of Classification Search
USPC ....................... 180/7.1, 21, 20, 10; 301/5.23
See application file for complete search history.

(56) References Cited

U.S. PATENT DOCUMENTS

| 1,305,535 | A | * | 6/1919 | Grabowiecki | ............... 301/5.23 |
| 3,789,947 | A | * | 2/1974 | Blumrich | ..................... 180/6.48 |
| 4,715,460 | A | * | 12/1987 | Smith | ............................. 180/7.1 |
| 4,926,952 | A | * | 5/1990 | Farnam | .......................... 180/6.5 |
| D309,254 | S | * | 7/1990 | Guile | ............................. D8/375 |
| 5,312,165 | A | * | 5/1994 | Spletter | ........................ 301/5.23 |

(Continued)

FOREIGN PATENT DOCUMENTS

| JP | 58-134107 U | 9/1983 |
| JP | 3130323 U | 3/2007 |

(Continued)

*Primary Examiner* — Kevin Hurley
*Assistant Examiner* — Michael Stabley
(74) *Attorney, Agent, or Firm* — Carrier Blackman & Associates, P.C.; William D. Blackman; Joseph P. Carrier (57) ABSTRACT

[Task] To allow a wheel that provides a performance required for use in an omni-directional vehicle to be manufactured in an efficient manner.
[Solution] An annular member (51) comprises a C-shaped main body (61) and a complementary member (62) defining an endless annular shape jointly with the main body (61), a joint (63) between the main body (61) and complementary member (62) includes mating surfaces that are non-perpendicular to the cross sectional center line of the annular member, and the main body (61) and the complementary member (62) are fixedly joined to each other by using a threaded bolt (64) passed radially through the mating surfaces.

7 Claims, 6 Drawing Sheets

(56) References Cited

U.S. PATENT DOCUMENTS

| | | | |
|---|---|---|---|
| 5,383,715 A | 1/1995 | Homma et al. | |
| 6,757,936 B2* | 7/2004 | Yamaguchi et al. | 16/47 |
| 6,857,707 B2* | 2/2005 | Guile | 301/5.23 |
| 7,264,315 B2* | 9/2007 | Lamprich et al. | 301/5.23 |
| 7,318,628 B2* | 1/2008 | Guile | 301/5.23 |
| 7,566,102 B2* | 7/2009 | Guile | 301/5.23 |
| 7,980,336 B2 | 7/2011 | Takenaka et al. | |
| 2008/0018167 A1 | 1/2008 | Fuji | |
| 2010/0096905 A1 | 4/2010 | Takenaka et al. | |
| 2011/0209932 A1 | 9/2011 | Takenaka et al. | |

FOREIGN PATENT DOCUMENTS

| | | |
|---|---|---|
| JP | 2008-290638 A | 12/2008 |
| WO | 9302872 A1 | 2/1993 |
| WO | 2006/068007 A1 | 6/2006 |
| WO | 2008/132778 A1 | 11/2008 |
| WO | 2008/132779 A1 | 11/2008 |
| WO | 2008/139740 A1 | 11/2008 |

* cited by examiner

WHEEL, AND FRICTION DRIVE DEVICE AND OMNI-DIRECTIONAL VEHICLE USING THE SAME

TECHNICAL FIELD

The present invention relates to a wheel, and a friction drive device and an omni-directional vehicle using the same, and in particular to a wheel that can be used for an omni-directional vehicle, and a friction drive device and an omni-directional vehicle using the same.

BACKGROUND OF THE INVENTION

A previously proposed wheel for an omni-directional vehicle comprises an endless, annular member and a plurality of free rollers each rotatably supported by the annular member around the tangential axial line thereof like so many beads of a rosary. See patent documents 1 and 2.

PRIOR ART

Patent Documents

Patent document 1: WO 2008/132778A
Patent document 2: WO 2008/132779A

BRIEF SUMMARY OF THE INVENTION

Task to be Achieved by the Invention

In the case of the wheel disclosed in patent document 1, it is a challenge to mount the free rollers on the annular member. One mounting method is to form the annular member as a continuous ring, and form each free roller from two halves so that the two halves of each free roller may be mounted on the annular member and then joined together by using threaded bolts sunken into the free roller.

However, this mounting structure requires the threaded bolts to be fastened for each free roller, and the assembly process is therefore highly laborious. Also, the two halves of each free roller must be joined at a high precision so that a truly cylindrical shape may be achieved. When a true cylinder shape is not achieved, the free roller is unable to provide a desired performance.

A primary object of the present invention is to allow a wheel that provides a performance required for use in an omni-directional vehicle to be manufactured in an efficient manner.

Means to Achieve the Task

The present invention provides a wheel, comprising an endless annular member, and a plurality of free rollers mounted on the annular member so as to be each rotatable around a tangential axial line of the annular member, wherein: the annular member includes a joint defined by opposing surfaces non-perpendicular to a cross sectional central axial line of the annular member, and the joint is configured to take an open state defining a working space for enabling the free rollers to be fitted on the annular member, and a closed state closing the working space and putting the annular member into an endless shape, the annular member being fixedly secured in the closed state by using a fastener that joins the opposing surfaces.

According to a certain aspect of the present invention, the annular member comprises an arcuate main body and a complementary member defining an endless annular shape jointly with the main body, the joint between the main body and complementary member includes mating surfaces that are non-perpendicular to the cross sectional center line of the annular member, and the main body and the complementary member are fixedly joined to each other by using the fastener that joins the opposing surfaces.

In the wheel of the present invention, preferably, the annular member is provided with a polygonal cross section extending perpendicular to the cross sectional center line of the annular member, and the non-perpendicular mating surfaces extend in a tangential direction of the annular member at a part having a greatest lateral width in the cross section perpendicular to the cross sectional center line of the annular member.

In the wheel of the present invention, preferably, a spacer is placed between each adjacent pair of the free rollers, and the spacer located at the joint is fixedly secured to the main body along with the complementary member by the fastener.

The present invention also provides a friction drive device, comprising a wheel defined above, a pair of drive rotatable members disposed on either side of the wheel so as to be rotatable around a central axial line of the annular member; and a plurality of drive rollers arranged along a circle concentric to the axial center line of each drive rotatable member so as to be each rotatable around a central axial line which is in a skewed relationship to the axial center line of the drive rotatable member, and having an outer circumferential surface engaging an outer circumferential surface of the free roller.

The present invention also provides a friction drive device, comprising a wheel defined above, a wheel supporting rotatable member disposed on one side of the wheel so as to be rotatable around a central axial line of the annular member and supporting the annular member of the wheel; a drive rotatable member disposed on the other side of the wheel so as to be rotatable around a central axial line of the annular member; and a plurality of drive rollers arranged along a circle concentric to the axial center line of the drive rotatable member so as to be each rotatable around a central axial line which is in a skewed relationship to the axial center line of the drive rotatable member, and having an outer circumferential surface engaging an outer circumferential surface of the free roller.

The present invention further provides an omni-directional vehicle, including a friction drive device defined above, and configured to travel by the wheel.

Effect of the Invention

According to the wheel of the present invention, the annular member is provided with a joint so that the free rollers may be mounted on the annular member without requiring the annular members to be made of two halves by opening the joint of the annular member so as to define a working space, and fitting each free roller onto the annular member from the working space. The joint can be fixedly closed by joining the opposing surfaces that are not perpendicular to the cross sectional center line of the annular member by using a fastener passed across the opposing surfaces, the joint can be fixed and the annular member is put into an endless shape by applying the fastener from outside the joint once the free rollers are mounted on the annular member.

DETAILED DESCRIPTION OF THE PREFERRED EMBODIMENT(S)

Referring to FIGS. 1 to 5, a wheel, and a friction drive device and an omni-directional vehicle using the same embodying the present invention are described in the following.

Figure 1:
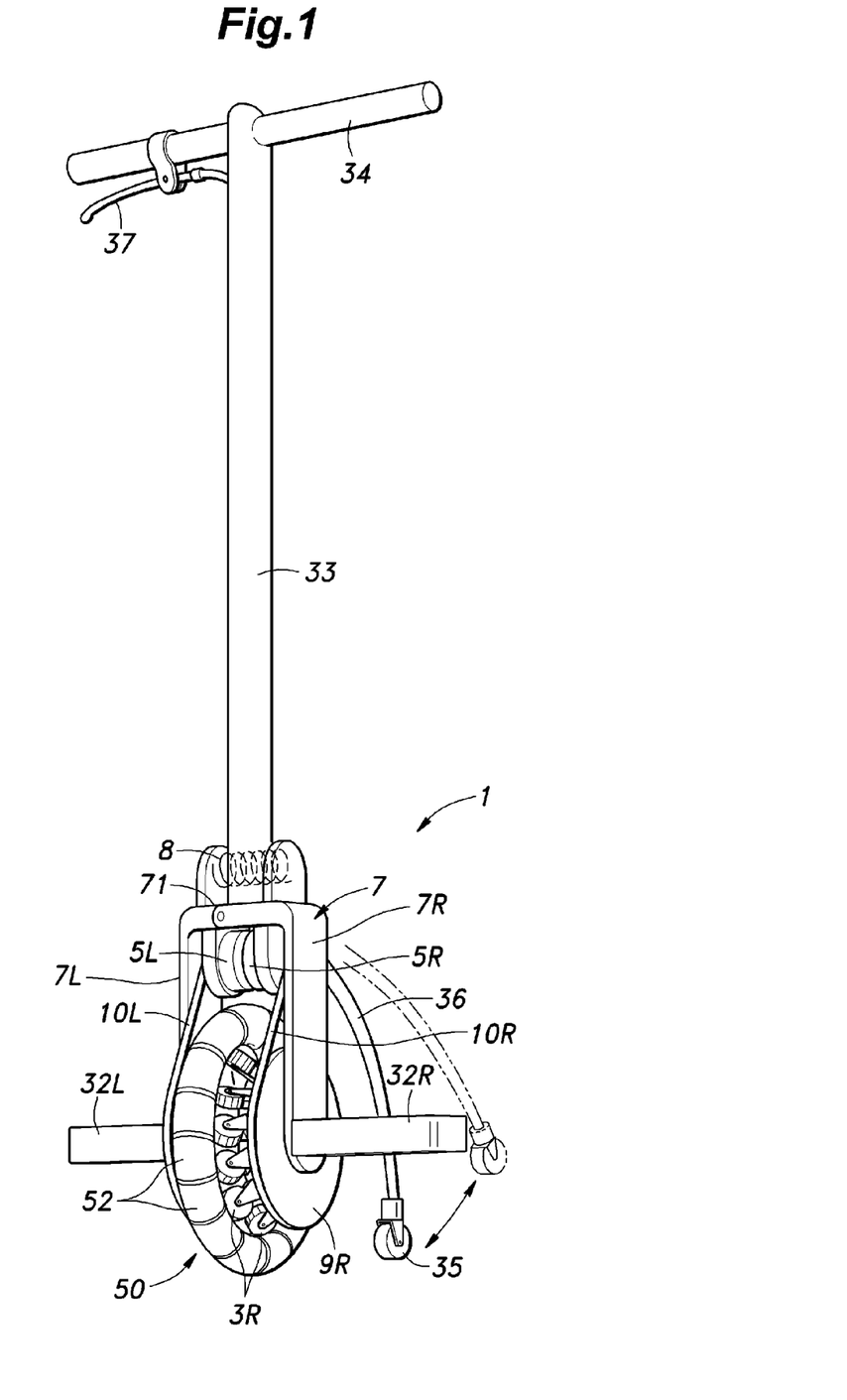
FIG. 1 is a perspective view of a wheel, and a friction drive device and an omni-directional vehicle using the same, given as a first embodiment of the present invention.
Figure 2:
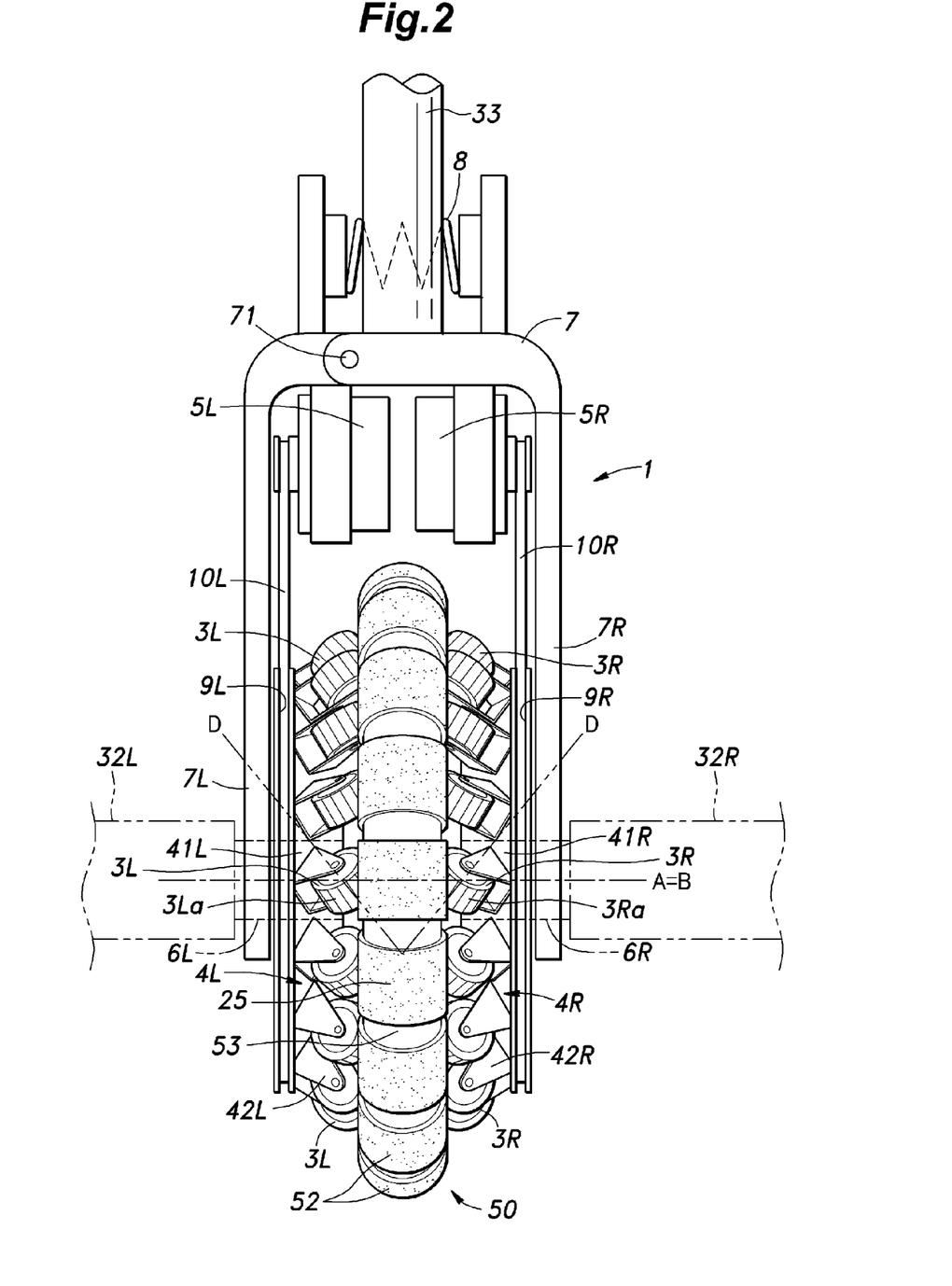
FIG. 2 is an enlarged front view of the wheel, and the friction drive device and omni-directional vehicle using the same.

As shown in FIGS. 1 and 2, the omni-directional vehicle 1 of the illustrated embodiment comprises a vehicle body 7 of a yoke configuration that supports a wheel 50 in a rotatable manner via a plurality of drive rollers (3L and 3R) as will be described hereinafter.

The vehicle body 7 includes a pair of leg members 7R and 7L that are hinged to each other via a hinge pin 71. Each leg member 7R, 7L is provided with a step 32R, 32L extending from outer side thereof substantially in the horizontal direction. To the left leg member 7L of the vehicle body 7 is affixed a lower end of a pole 33 which extends vertically upward and is provided with a horizontally extending handle bar 34 at the upper end thereof. A compression coil spring 8 is interposed between the right and left leg members 7R and 7L of the vehicle body 7 so that the two leg members 7R and 7L are resiliently urged toward each other.

The vehicle body 7, two steps 32R and 32L, pole 33 and handle bar 34 are integrally joined to each other, and jointly form a vehicle body of the omni-directional vehicle 1.

The vehicle body 7 is fitted with an auxiliary wheel 35 via an arm 36 having an upper end pivotally supported by a rear part of the of the vehicle body 7 so as to be raised and lowered as required. The auxiliary wheel 35 is located behind the wheel 50 and rotatable around a horizontal axial line. The handle bar 34 is provided with a grip lever 37 that is connected to an end of the arm 36 via a per se known Bowden cable (not shown in the drawings) so that the arm 36 may be raised by squeezing the grip lever 37 against the handle bar 34 by hand.

A right drive rotatable member 4R is rotatably supported by the right leg member 7R via a support shaft 6R, and a left drive rotatable member 4L is rotatably supported by the left leg member 7L via a support shaft 6L so that the right and left drive rotatable members 4R and 4L are rotatably supported by the vehicle body 7 around a common central axial line (A) in an axially (laterally) spaced apart relationship.

Each drive rotatable member 4R, 4L is integrally and coaxially provided with a pulley (or sprocket) 9R, 9L. Each leg member 7R, 7L is provided with an electric motor 5R, 5L. The electric motor 5R is drivingly connected to the pulley 9R via an endless belt (or link chain) 10R to rotatively actuate the pulley 9R. The electric motor 5L is drivingly connected to the pulley 9L via an endless belt (or link chain) 10L to rotatively actuate the pulley 9L.

The vehicle body 7 and/or the pole 33 are incorporated with a rechargeable battery for powering the electric motors 5R and 5L and a control unit not shown in the drawings.

Each drive rotatable member 4R, 4L is formed with a frusto-conical tapered outer circumferential surface 41R, 41L opposing the other drive rotatable member 4R, 4L. To the frusto-conical tapered outer circumferential surface 41R of the right drive rotatable member 4R are mounted a plurality of drive rollers 3R which are arranged circumferentially, each via a bracket 42R, at a regular angular interval. To the frusto-conical tapered outer circumferential surface 41L of the left drive rotatable member 4L are mounted a plurality of drive rollers 3L which are arranged circumferentially, each via a bracket 42L, at a regular angular interval.

The wheel 50 is located between the right and left drive rotatable members 4R and 4L, and is rotatably supported around a central axial line (B) coaxial with the central axial line (A) of the right and left drive rotatable members 4R and 4L by being interposed between the right drive rollers 3R of the right drive rotatable member 4R and left drive rollers 3L of the left drive rotatable member 4L.

Figure 3:
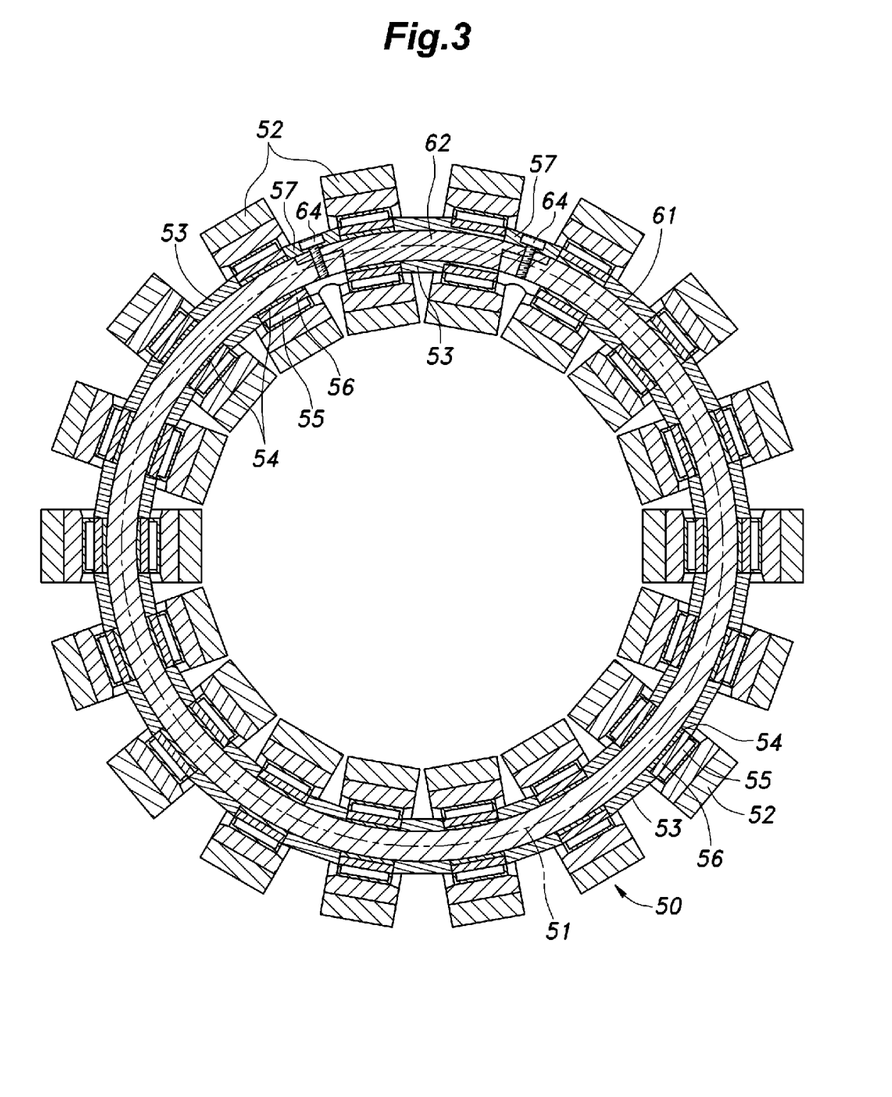
FIG. 3 is an enlarged sectional view of the wheel.
Figure 4:
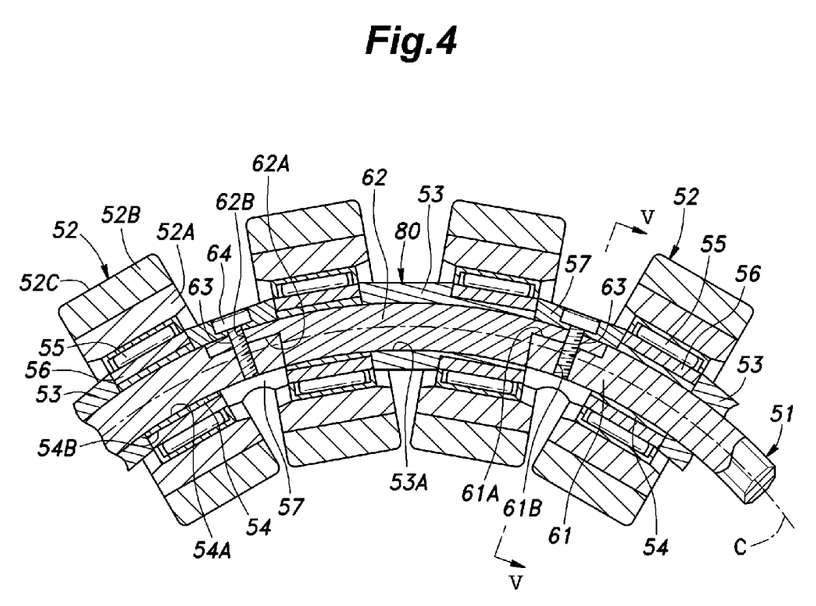
FIG. 4 is an enlarged sectional view of an essential part of the wheel.

As shown in FIGS. 3 and 4, the wheel 50 comprises an annular member 51 having a regular octagonal cross section, a plurality of free rollers 52 rotatably supported thereby so as to be rotatable around an axial line tangential to the corresponding point of the annular member 51, and a spacer 53 interposed between each adjacent pair of the free rollers 52. In the illustrated embodiment, the annular member 51 has a regular octagonal cross section which is perpendicular to the cross sectional center line of the annular member 51.

A plurality of inner sleeves 54 each having an octagonal bore 54A curved at a same curvature as the annular member 51 are fitted on the annular member 51 in a rotationally fast manner The outer circumferential surface 54B of each inner sleeve 54 defines a true cylindrical surface. An inner race 56 of a needle bearing 55 is fitted on the outer circumferential surface 54B.

Each free roller 52 consists of a freely rotatable roller engaging an object to which a drive force is to be transmitted or applied, and is fitted around the annular member 51 like beads of a rosary. Each free roller 52 comprises a cylindrically-shaped sleeve 52A made of metallic material and a cylindrically-shaped peripheral member 52B made of rubber-like or elastomeric material bonded to the outer circumferential surface of the metallic sleeve 52A and defining an outer circumferential surface 52C of the free roller 52, and is mounted on the annular member 51 in rotatable manner around the tangential axial line thereof using the metallic sleeve 52A as an outer race of the needle bearing 55. Here, each free roller 52 rotates around the central axial line thereof, and this will be referred to as the rotation of the free roller 52 around the axial center line thereof.

Each spacer 53 is made of metallic material, and is provided with a regular octagonal bore 53A curving at a same curvature as the annular member 51, and is fitted on the annular member 51 to serve as a distance piece preventing the adjoining free rollers 52 from contacting each other.

Each spacer 53 engages the end surfaces of the inner sleeve 54 and inner race 56 at the end surface thereof substantially without any play. The same is true with the spacer 57 which engages the end surfaces of the inner sleeve 54 and inner race 56 at the end surface thereof as will be described hereinafter.

Thereby, the spacers 53 and 57, inner sleeves 54 and inner races 56 jointly form an annular (closed loop) assembly which is rigidly connected to each other along the circumference of the annular member 51. This assembly reinforces the annular member, and prevents the annular member 51 from deforming into an elliptic shape when the wheel 50 is used as a part of a vehicle, and subjected to a loading.

The annular member 51 consists of a C-shaped arcuate main body 61 made of a metallic regular polygonal rod and an arcuate complementary body 62 made of a similar metallic regular polygonal rod which is configured to form an endless annular shape in cooperation with the main body 61.

Figure 5:
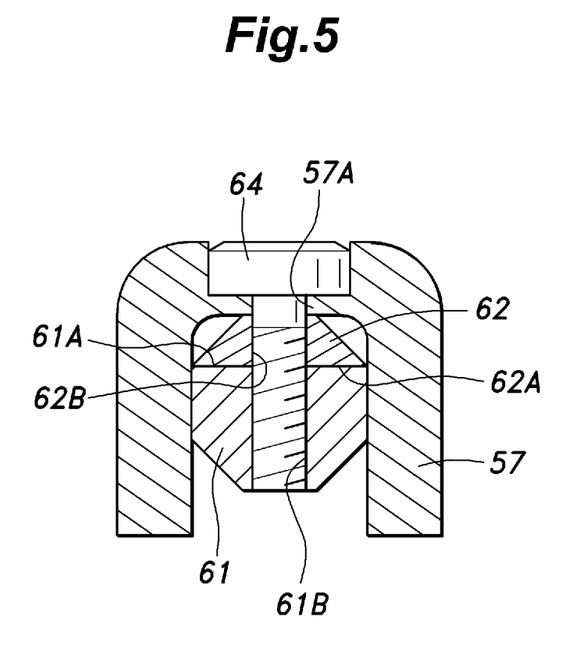
FIG. 5 is an enlarged sectional view of an essential part of the wheel (taken along line V-V of FIG. 4)

A pair of joints 63 between the main body 61 and complementary member 62 are formed at the two ends of the complementary member 62, and each joint 63 is defined by a stepped interface including the opposing mating surfaces 61A and 62A of the main body 61 and complementary member 62 which are not perpendicular to the cross sectional center line C of the main body 61, and may consist of surfaces extending in parallel with a plane containing the cross sectional center line C. At each joint 63, a threaded hole 61B is passed radially into the main body 61 through the mating surface 61A, and a corresponding through hole 62B is passed radially through the complementary member 62 through the mating surface 62A. In the illustrated embodiment, the through hole 62B is located radially outward with respect to the corresponding threaded hole 61B.

The mating surfaces 61A and 62A extend tangentially with respect to the annular member 51 at a part of the cross section of the annular member 51 where the lateral width is the greatest. Therefore, the width (lateral dimension as seen in FIG. 5) of the mating surfaces 61A and 62A can be made relatively large so that the diameter of the threaded hole 61B and through hole 62B can be maximized.

Thus, the main body 61 and complementary member 62 can be integrally but detachably joined together by passing the threaded bolt 64 through the through hole 62B, and threading the threaded bolt 64 into the threaded hole 61B at each joint 63. Thereby, the annular member 51 is closed so as to define the annular shape.

When installing the free roller assembly consisting of the free roller 52, needle bearing 55, inner race 56 and inner sleeve 54, along with the spacer 53, the complementary member 62 is removed from the main body 61 by removing the threaded bolt 64 to define a working space for assembling the free roller assembly and spacer 53 in the space that has been occupied by the complementary member 62. This working space is provided so that the free roller assembly and spacer 53 may be fitted on the main body 61.

With the working space thus provided, the free roller assemblies and spacers 53 are fitted on the main body 61 one after another in an alternating manner. The free roller assemblies and spacers 53 are similarly fitted on the complementary member 62 one after another in an alternating manner. Therefore, each free roller 52 or each inner race 56 is not required to be made of two halves for the free roller or the inner race to be fitted on the annular member 51.

Once the prescribed numbers of the free roller assemblies and spacers 53 are fitted on the main body 61 and complementary member 62, the complementary member 62 is joined to the main body 61, and the threaded bolt 64 is passed through the through hole 62B and threaded into the threaded hole 61B at each joint 63. Thereby, the main body 61 and complementary member 62 are firmly jointed to each other, and jointly form the fully closed, endless annular member 51.

As the through hole 62B is located radially outward of the threaded hole 61B in the cross section of the annular member 51, the fastening of the threaded bolt 64 can be accomplished from a radially outward part of the annular member 51 following the assembling of the free roller assemblies and spacers 53.

Therefore, the wheel 50 can be assembled in an efficient manner while ensuring the required performance thereof.

A horseshoe shaped spacer 57 is used in each joint 63 so that the spacer 57 may be installed after the wheel 50 is otherwise fully assembled. This special spacer 57 is formed with a through hole 57A for receiving the threaded bolt 64 so that the spacer 57 may be fixed in position at the same time as joining the complementary member 62 to the main body 61. Thereby, a distance piece is also provided in each joint 63 so as to prevent the adjoining free rollers 52 from contacting each other.

The mating surfaces 61A and 62B extend in the tangential direction of the annular member 51 at a part of the cross section of the annular member 51 perpendicular to the cross sectional center line thereof where the lateral width is the greatest so that the lateral dimension of the mating surfaces 61A and 62A can be maximized, and the diameters of the through hole 62B and threaded hole 61B can be maximized. Thereby, the threaded bolt 64 may have a relatively large diameter, and the mechanical strength of the fastening structure at each joint 63 can be maximized.

As shown by numeral 80 in FIG. 4, the spacer 53 and inner sleeve 54 may consist of a single integral member. By so doing the number of component parts can be reduced, and the assembly work can be simplified.

The relationship between (the numbers of) the free rollers 52, the right drive rollers 3R and left drive rollers 3L is selected such that the free roller 52 engaging the road surface is engaged by at least one of the right drive rollers 3R and by at least one of the left drive rollers 3L, and is given with a traction force (rotative force) by the right drive roller 3R and left drive roller 3L without being left undriven at all times.

The right and left drive rollers 3R and 3L are urged against the outer circumferential surfaces 52C of the free rollers 52 under the spring force of the compression coil spring 8 such that the outer circumferential surfaces 3Ra and 3La of the right and left drive rollers 3R and 3L engage the outer circumferential surfaces 52C of the free rollers 52, and a traction force (rotative force) is frictionally transmitted from the drive rollers 3R and 3L to the free rollers 52. In other words, the outer circumferential surfaces 3Ra and 3La of the right and left drive rollers 3R and 3L engage the outer circumferential surfaces 52C of the free rollers 52 in a frictional power transmitting relationship so as to cause the rotational and translational movement of the free rollers 52.

The right and left drive rollers 3R and 3L are disposed so as to be rotatable around a central axial line D extending neither perpendicularly nor in parallel to the rotational direction of the wheel 50 around the central axial line B thereof (or the central axial line A of the drive rotatable members 4R and 4L (or more specifically the tangential direction of the circumference around the central axial line B at the point of contact). In other words, the right and left drive rollers 3R and 3L have a rotational center line (central axial line D) that extends obliquely with respect to the rotational direction of the wheel 50 around the central axial line B, and is in a skewed relationship to the rotational center line (central axial line A) of the drive rotatable members 4R and 4L.

In the wheel 50 of the illustrated embodiment, the free rollers 52 rotate around the tangential line of the annular member 51 owing to the engagement with the right and left drive rollers 3R which rotate with the drive rotatable members 4R and 4L, and are thereby enabled to produce a lateral drive force at the ground contact surface. Also, the rotation of the wheel 50 as a whole around the central axial line B or the circumferential movement thereof produces a fore-and-aft traction force at the ground contact surface.

In the omni-directional vehicle of the illustrated embodiment, if the drive rotatable members 4R and 4L are made to rotate in opposite directions and/or at different speeds powered by the corresponding electric motors 5R and 5L, as the drive rotatable members 4R and 4L drive the drive rollers 3R and 3L along the circumference of the drive rotatable members 4R and 4L, the right and left drive rollers 3R and 3L apply a component of force perpendicular to the circumferential force to the contact surface of the wheel 50. This component of force twists or rotatively actuates the corresponding free roller 52 of the wheel 50 around the central axial line of the free roller 52, and causes the free roller 52 to rotate around the central axial line thereof.

The rotation of each free roller 52 around the rotational center thereof is caused by the difference between the rotational speeds of the drive rotatable members 4R and 4L. For instance, when the drive rotatable members 4R and 4L are rotated at the same speed but in opposite directions, the wheel 50 does not rotate around the central axial line B, and only the free rollers 52 rotate around the central axial lines thereof As a result, the wheel 50 produces a traction force directed in the direction of the central axial line B of the wheel or a lateral traction force so that the omni-directional vehicle 1 is caused to move laterally.

On the other hand, when the drive rotatable members 4R and 4L are rotated at the same speed and in the same direction, the free rollers 52 do not rotate around the central axial lines thereof, and the wheel 50 rotates around the central axial line B thereof As a result, the wheel 1 moves forward or backward without turning.

In this manner, by individually controlling the rotational speeds and rotational directions of the drive rotatable members 4R and 4L via the two electric motors 5R and 5L, the omni-directional vehicle 1 can be propelled on the road surface in any desired direction.

Figure 6:
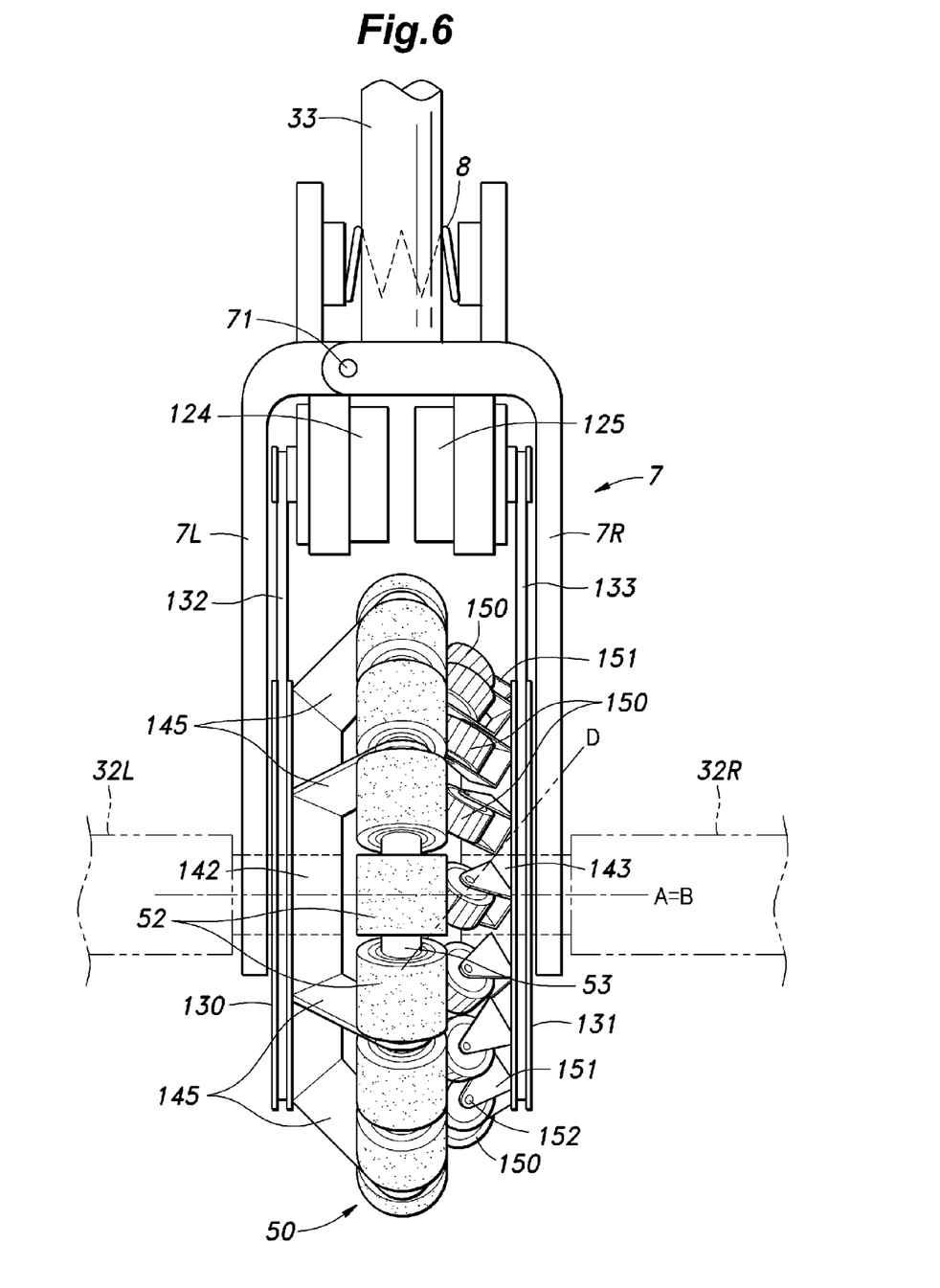
FIG. 6 is a front view showing a friction drive device and an omni-directional vehicle using the wheel of the present invention, given as a second embodiment of the present invention.

FIG. 6 shows another embodiment of the friction drive device and the omni-directional vehicle using the same. In FIG. 6, the parts corresponding to those of the embodiment illustrated in FIG. 2 are denoted with like numerals without repeating the description of such parts.

In this embodiment, a wheel supporting rotatable member 142 is mounted on the left leg member 7L of the vehicle body 7, and a drive rotatable member 143 is mounted on the right leg member 7R of the vehicle body 7 both rotatable around the common central axial line A.

An electric motor 124 is mounted on the left leg member 7L of the vehicle body 7. A pulley (or sprocket) 130 is integrally formed on the wheel supporting rotatable member 142 in a coaxial manner. The electric motor 124 is drivingly connected to the pulley 130 via an endless belt (or a link chain) 132 to rotatively actuate the wheel supporting rotatable member 142.

Another electric motor 125 is mounted on the right leg member 7R of the vehicle body 7. A pulley (or sprocket) 131 is integrally formed on the drive rotatable member 143 in a coaxial manner. The electric motor 125 is drivingly connected to the pulley 131 via an endless belt (or a link chain) 133 to rotatively actuate the drive rotatable member 143.

The wheel supporting rotatable member 142 is provided with a plurality of arms 145 extending from the tapered outer circumferential surface thereof toward the drive rotatable member 143 (rightward as seen in FIG. 6). The arms 145 support a wheel 50 comprising an annular member 51, free rollers 52 and spacers 53 in a similar fashion as the wheel 50 of the previous embodiment. In the illustrated embodiment, the spacers 53 of the wheel 50 are fixedly secured to the wheel supporting rotatable member 142 via the arms 145. Thereby, the wheel 50 is supported by the wheel supporting rotatable member 142 on one lateral side thereof so as to be rotatable around the central axial line coaxial with the center of the annular member 51.

To the side of the drive rotatable member 143 facing the wheel supporting rotatable member 142 are mounted a plurality of drive rollers 150 which are arranged circumferentially, each via a bracket 151, at a regular angular interval. Each drive roller 150 engages the outer circumferential surface of the corresponding free roller 52 in a torque transmitting relationship, and is supported by the corresponding bracket 151 so as to be rotatable around the central axial line D which is in a skewed relationship to the central axial line of the corresponding free roller 52. In other words, the central axial line of each free roller 52 is in a skewed relationship with respect to the central axial line of the corresponding drive roller 150 at the point of contact.

As seen on the projected surface perpendicular to the central axial line A, the central axial line of each drive roller 150 is tilted with respect to the central axial line of the corresponding free roller 52. The central axial line of the drive roller 150 is tilted not only with respect to the radial line of the annular member 51 defining the central axial line of the of the corresponding free roller 52 (at the corresponding free roller 52) by a certain angle but also with respect to the imaginary plane tangential to the cross sectional central axial line of the annular member 51. This three dimensional tilting of the axial line is similar to the tilting of the teeth of a conical helical gear placed on a conical surface of a certain cone angle.

By thus tiling the pivot pin 152 of each drive roller 150, when the wheel supporting rotatable member 142 and the drive rotatable member 143 are rotated relative to each other, the point of contact between the drive roller 150 and free roller 52 is subjected to a frictional force including a component directed around the rotational axial line of the free roller 52 and a component directed to the tangential direction. In this case also, the relationship between (the numbers of) the free rollers 52 and drive rollers 150 is selected such that the free roller 52 engaging the road surface is engaged by at least one of the drive rollers, and is always rotatively actuated by the drive roller 150. Thereby, the free roller 52 is prevented from losing traction at all times.

Owing to this structure, by rotating the drive rotatable member 143 and keeping the wheel supporting rotatable member 142 stationary, the circumferential movement of the drive rotatable member 143 produces a component of force directed around the free roller 52 which is engaged by the drive roller 150. As a result, the contact surface between the free roller 52 and the drive object is subjected to a drive force which is in parallel with the rotational axial line of the wheel supporting rotatable member 142 and drive rotatable member 143 (lateral direction as seen FIG. 6).

When the wheel supporting rotatable member 142 and drive rotatable member 143 are rotated at a same speed and in a same direction, as the free roller 52 engaged by the drive roller 150 receives no rotative force around the central axial line thereof, the contact surface between the free roller 52 and the drive object is subjected to a drive force which is directed in the direction of the rotational of the wheel supporting rotatable member 142 and drive rotatable member 143.

In this manner, by individually controlling the rotational speeds and rotational directions of the wheel supporting rotatable member 142 and drive rotatable member 143, similarly as the previous embodiment, a drive force of any desired direction may be produced in the contact surface between the free roller 52 provided on the wheel supporting rotatable member 142 and the drive object.

As the wheel 50 of this embodiment is similar to the wheel 50 of the previous embodiment, the operation and action similar to those of the previous embodiment can be achieved and obtained with respect to the assembling of the free rollers 52.

The main body 61 and complementary member 62 may consist of semi-circular complementary two halves. In the foregoing embodiments, the annular member 51 consisted of the main body 61 and complementary member 62 which are joined to each other at two joints 63. However, it is also possible to form the annular member 51 as being separated only at one joint 63. In this case, the assembly work space can be defined by resiliently deforming the opposing ends of the annular member in a radial direction away from each other. The non-perpendicular interface between the opposing surfaces at the joint may also consist of a tilted plane. The cross sectional shape of the annular member 51 may not be octagonal, but may also be other polygonal shape such as rectangle and hexagonal shapes or even a circular shape.

GLOSSARY 1 omni-directional vehicle
2 wheel
3R right drive roller
3L left drive roller
4L, 4R drive rotatable member
7 vehicle body
50 wheel
51 annular member
53 free roller
53 spacer
61 main body
62 complementary member
63 joint
64 threaded bolt
142 wheel supporting drive rotatable member
143 drive rotatable member
150 drive roller

The invention claimed is:

1. A wheel, comprising an endless annular member, and a plurality of free rollers mounted on the annular member so as to be each rotatable around a tangential axial line of the annular member, wherein:
the annular member comprises an arcuate main body and a complementary member configured to define an endless annular shape jointly with the main body; a joint between the main body and the complementary member includes mating surfaces that are non-perpendicular to a cross sectional center line of the annular member; and the joint is configured to be changeable between an open state where the complimentary member is removed from the main body to define a working space for enabling the free rollers to be fitted on the annular member, and a closed state where the complementary member is fixedly joined to the main body by using a fastener that joins the mating surfaces to close the working space.

2. The wheel according to claim 1, wherein the annular member is provided with a polygonal cross section extending perpendicular to the cross sectional center line of the annular member, and the non-perpendicular mating surfaces extend in a tangential direction of the annular member at a part having a greatest lateral width in the cross section perpendicular to the cross sectional center line of the annular member.

3. The wheel according to claim 1, wherein a spacer is placed between each adjacent pair of the free rollers, and the spacer located at the joint is fixedly secured to the main body along with the complementary member by the fastener.

4. A friction drive device, comprising
a wheel comprising an endless annular member, and a plurality of free rollers mounted on the annular member so as to be each rotatable around a tangential axial line of the annular member, wherein the annular member includes a joint defined by opposing surfaces non-perpendicular to a cross sectional central axial line of the annular member, and the joint is configured to be changeable between an open state defining a working space for enabling the free rollers to be fitted on the annular member, and a closed state closing the working space and putting the annular member into an endless shape, the annular member being fixedly secured in the closed state by using a fastener that joins the opposing surfaces,
a pair of drive rotatable members disposed on either side of the wheel so as to be rotatable around a central axial line of the annular member; and
a plurality of drive rollers arranged along a circle concentric to an axial center line of each drive rotatable member so as to be each rotatable around a central axial line which is in a skewed relationship to the axial center line of the drive rotatable member, and having an outer circumferential surface engaging an outer circumferential surface of the free roller.

5. An omni-directional vehicle, including a friction drive device according to claim 4, and configured to travel by the wheel.

6. A friction drive device, comprising
a wheel comprising an endless annular member, and a plurality of free rollers mounted on the annular member so as to be each rotatable around a tangential axial line of the annular member, wherein the annular member includes a joint defined by opposing surfaces non-perpendicular to a cross sectional central axial line of the annular member, and the joint is configured to be changeable between an open state defining a working space for enabling the free rollers to be fitted on the annular member, and a closed state closing the working space and putting the annular member into an endless shape, the annular member being fixedly secured in the closed state by using a fastener that joins the opposing surfaces,
a wheel supporting rotatable member disposed on one side of the wheel so as to be rotatable around a central axial line of the annular member and supporting the annular member of the wheel;
a drive rotatable member disposed on the other side of the wheel so as to be rotatable around the central axial line of the annular member; and
a plurality of drive rollers arranged along a circle concentric to an axial center line of the drive rotatable member so as to be each rotatable around a central axial line which is in a skewed relationship to the axial center line of the drive rotatable member, and having an outer circumferential surface engaging an outer circumferential surface of the free roller.

7. An omni-directional vehicle, including a friction drive device according to claim 6, and configured to travel by the wheel.

* * * * *